United States Patent
Yang et al.

(10) Patent No.: US 12,373,074 B2
(45) Date of Patent: Jul. 29, 2025

(54) TOUCH PANEL HAVING A MESH-TYPED ELECTRODE LAYER

(71) Applicant: DONGWOO FINE-CHEM CO., LTD., Iksan-si (KR)

(72) Inventors: Jinbok Yang, Iksan-si (KR); Kyoung Mo Lee, Iksan-si (KR); Chan-Hee Lee, Iksan-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/617,222

(22) Filed: Mar. 26, 2024

(65) Prior Publication Data
US 2024/0329787 A1    Oct. 3, 2024

(30) Foreign Application Priority Data

Mar. 27, 2023   (KR) .......................... 10-2023-0039592
Mar. 6, 2024   (KR) .......................... 10-2024-0032034

(51) Int. Cl.
*G06F 3/044*     (2006.01)

(52) U.S. Cl.
CPC .......... *G06F 3/0446* (2019.05); *G06F 3/0445* (2019.05); *G06F 3/0448* (2019.05); *G06F 2203/04112* (2013.01)

(58) Field of Classification Search
None
See application file for complete search history.

(56) References Cited

U.S. PATENT DOCUMENTS

| | | | |
|---|---|---|---|
| 2011/0062146 A1* | 3/2011 | Kuriki | H05B 3/84 428/131 |
| 2013/0127775 A1* | 5/2013 | Yilmaz | G06F 3/0446 200/600 |
| 2017/0177147 A1* | 6/2017 | Sakamoto | G02F 1/136286 |
| 2018/0253175 A1* | 9/2018 | Yao | G06F 3/0445 |
| 2018/0275801 A1* | 9/2018 | Nakayama | G06F 3/047 |
| 2020/0089372 A1* | 3/2020 | Park | G06F 3/0448 |
| 2020/0301545 A1* | 9/2020 | Yang | G06F 3/0446 |

FOREIGN PATENT DOCUMENTS

CN          218866733 U   *   4/2023
KR   10-2017-0114648 A     10/2017

* cited by examiner

*Primary Examiner* — Kirk W Hermann
(74) *Attorney, Agent, or Firm* — Sughrue Mion, PLLC

(57) ABSTRACT

A touch panel having a mesh-typed electrode layer includes a substrate layer and the mesh-typed electrode layer formed on the substrate layer, in which the mesh-typed electrode layer has a mesh pattern and a metal line between nodes is configured in a wave shape.

10 Claims, 7 Drawing Sheets

FIG. 1 --Prior Art--

FIG. 2
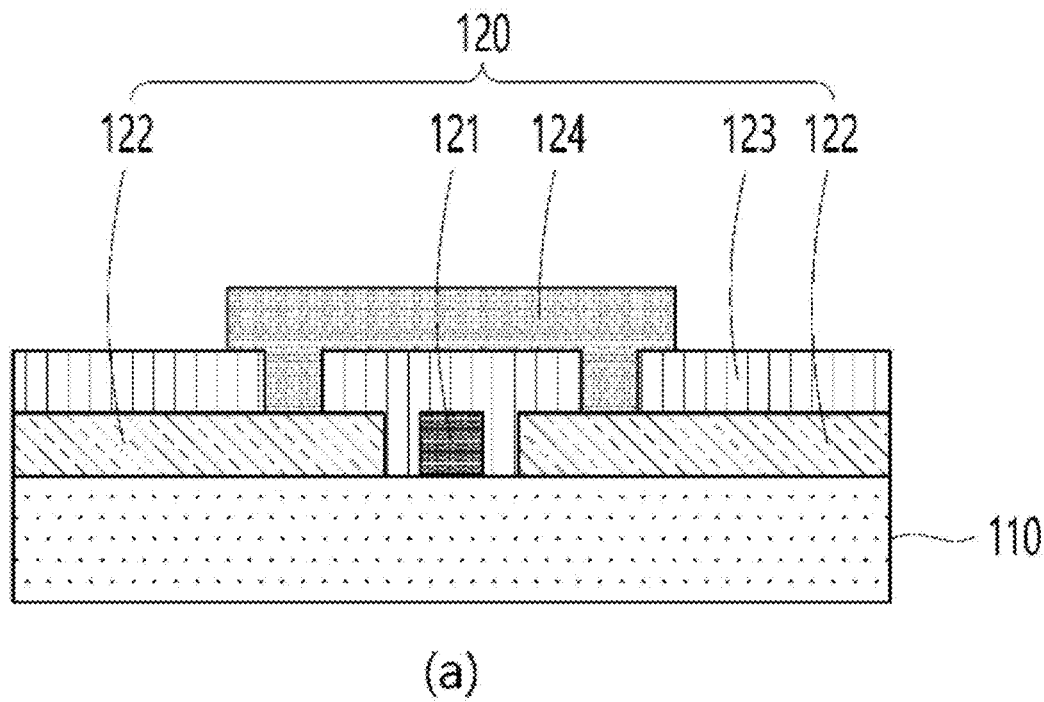
(a)
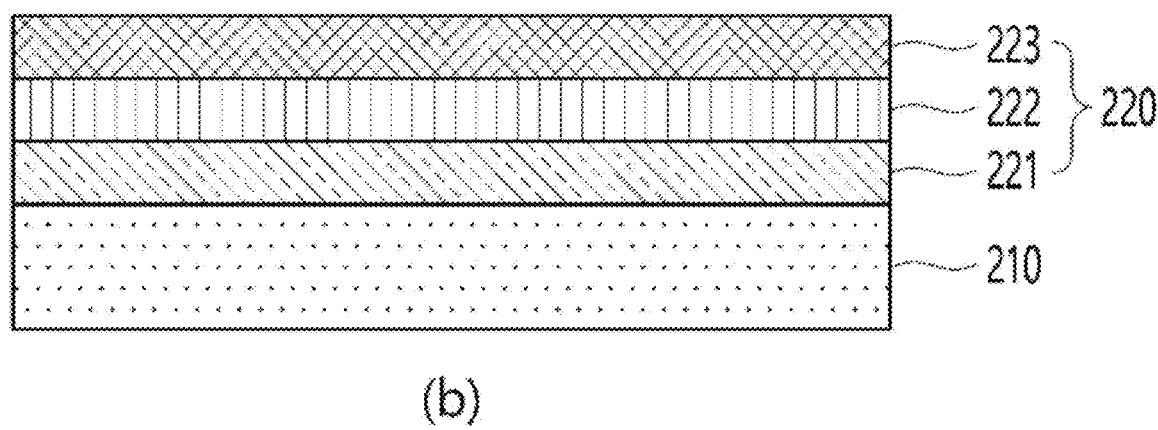
(b)

[Figure 3]
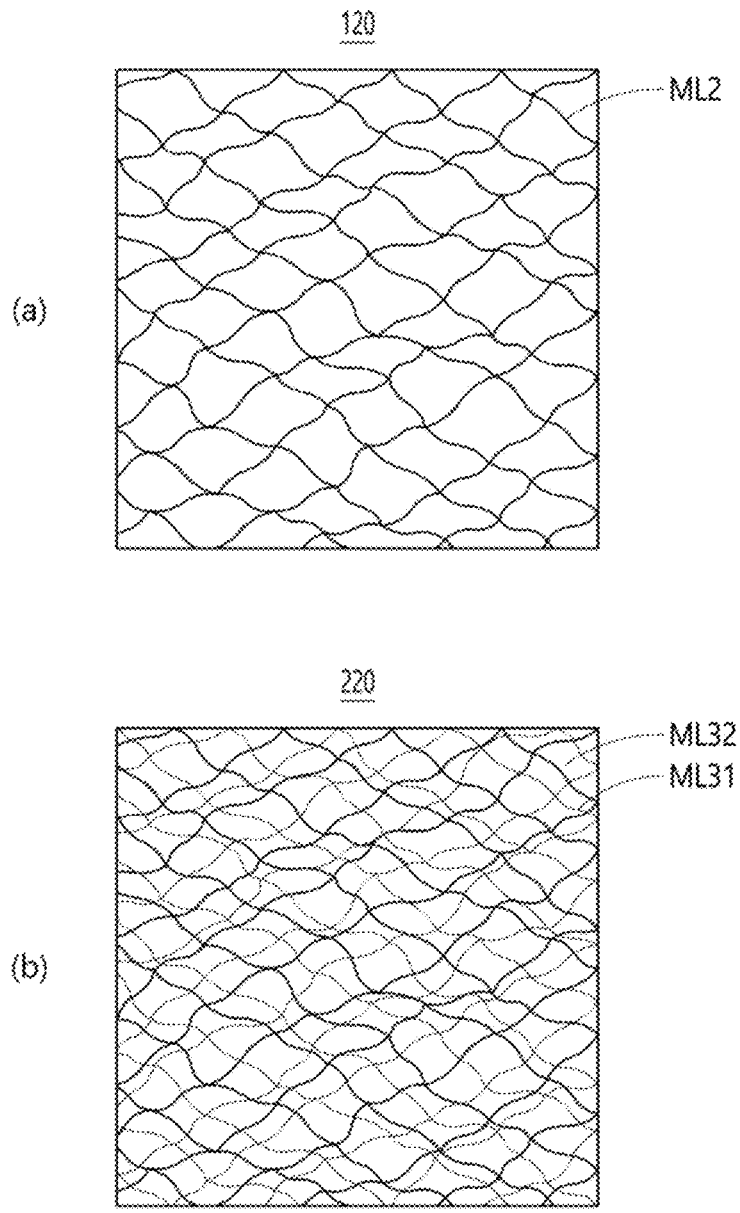

[Figure 4]
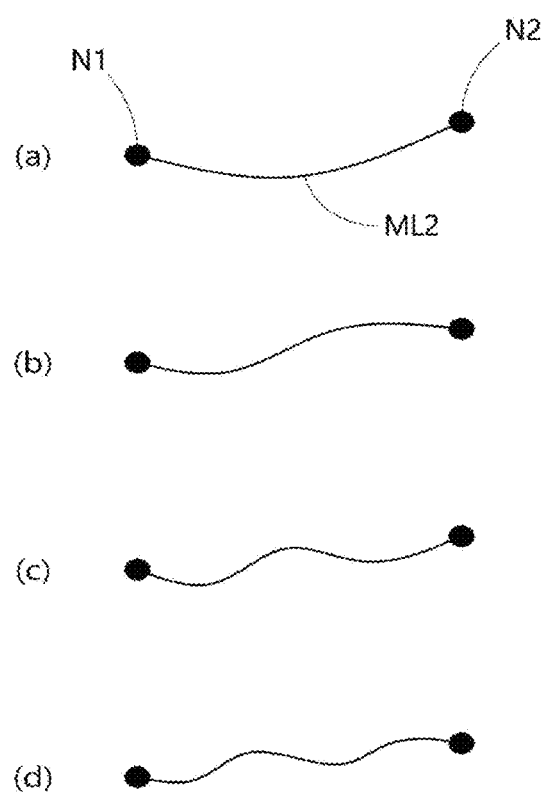

[Figure 5]
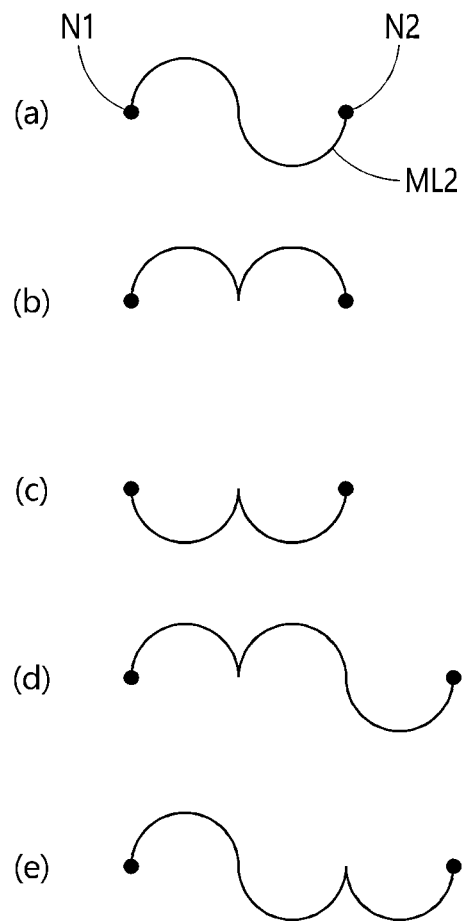

[Figure 6]
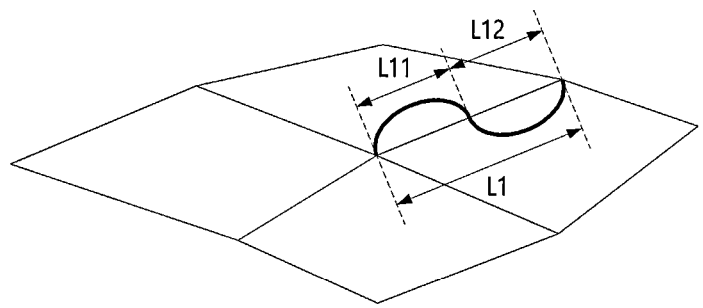
(a)
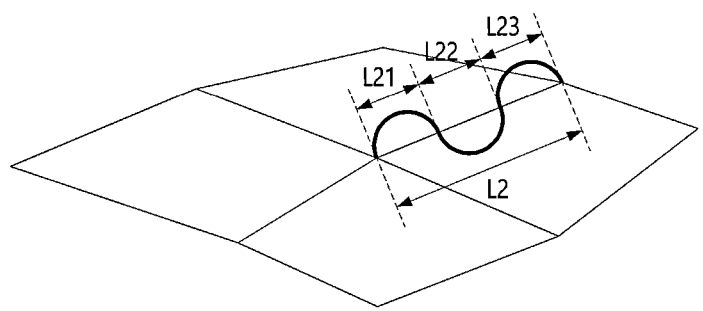
(b)
[Figure 7]
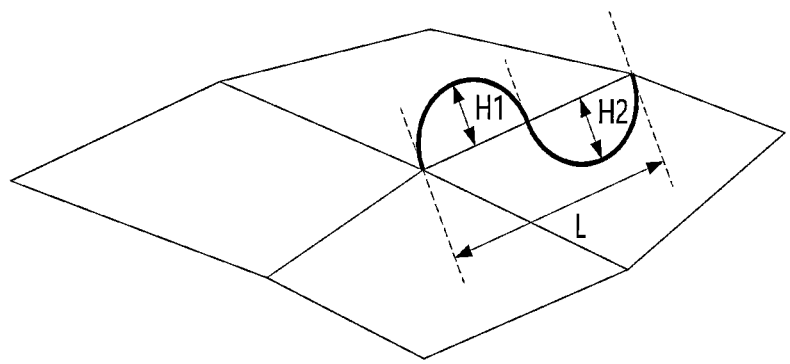

[Figure 8]
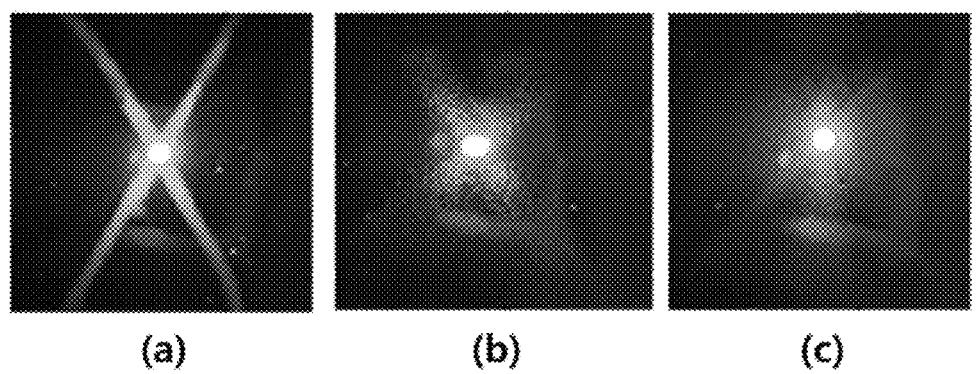
(a) (b) (c)

TOUCH PANEL HAVING A MESH-TYPED ELECTRODE LAYER

CROSS REFERENCE TO RELATED APPLICATIONS

The instant application claims priority based on Korean Patent Application No. 10-2023-0039592 filed Mar. 27, 2023 and Korean Patent Application No. 10-2024-0032034 filed Mar. 6, 2024, the entire contents of which are hereby incorporated by reference.

TECHNICAL FIELD

The present invention relates to a touch panel. Particularly, the present invention relates to a touch panel configuring metal lines in the form of a wave in a mesh-typed electrode layer.

BACKGROUND ART

A touch panel is an input device that is added to a display device or designed to be embedded within a display device, such as a liquid crystal display (LCD), plasma display panel (PDP), organic light emitting diode (OLED), active matrix organic light emitting diode (AMOLED), etc. When an object, such as a finger or pen, touches the screen, it can recognize it as an input signal.

Touch panels can be of the capacitive type, which recognizes input signals by detecting changes in capacitance, the resistive type, which recognizes input signals by detecting changes in resistance value due to pressure, and the infrared sensing type, which recognizes input signals by detecting whether infrared light is blocked using infrared emitting and receiving elements. The capacitive type is commonly used in touch panels.

A capacitive touch panel includes a wire pattern to detect changes in capacitance. The wire pattern can be formed in a mesh pattern, such as a net, to increase light transmission. The touch panel may comprise a single layer of the wire pattern, or may comprise two layers of them.

Meanwhile, the mesh pattern can be formed by repeating metal lines at regular intervals. In this case, the moiré phenomenon may occur. When the wire patterns overlap, the moiré phenomenon can be exacerbated.

FIG. 1 is a top view of a touch panel having a mesh-typed electrode layer according to the prior art. As shown in FIG. 1, a conventional touch panel comprises metal lines ML1 of the electrode layer 10 in a generally straight form.

However, the straight metal lines ML1 may exhibit severe moiré phenomena depending on their placement, overlapping, etc., and in some cases, even starburst (light smearing) may occur.

PRIOR ART

Korean Patent Publication No. 10-2017-0114648 (Touch sensor and touchscreen panel using the same)

DISCLOSURE

Technical Problem

The present invention aims to solve these problems of the prior art.

It is an object of the present invention to minimize the moiré phenomenon by modifying the shape of the metal lines in the mesh-typed electrode layer.

Another object of the present invention is to minimize the starburst phenomenon by optimizing the shape of the metal lines.

Technical Solution

A touch panel of the present invention to achieve such objects may comprise a substrate layer, and a mesh-typed electrode layer formed on the substrate layer, in which the mesh-typed electrode layer has a mesh pattern and a metal line between nodes is configured in a wave shape.

In the touch panel of the present invention, the metal line may be configured in a 2-point wave shape or a 3-point wave shape.

In the touch panel of the present invention, the metal line may be configured in combination of 1- to 3-point wave shapes.

In the touch panel of the present invention, the metal line may have an irregular shape.

In the touch panel of the present invention, the metal line may be randomly arranged.

In the touch panel of the present invention, the metal line may be configured in the form of a sine wave.

In the touch panel of the present invention, the metal line may be configured to randomly arrange half-cycle sine waves up and down.

In the touch panel of the present invention, the metal line may be configured to satisfy the equation below:

$$[L/N - L/N \times 0.3] \leq \text{horizontal length of a half-cycle sine wave} \leq [L/N + L/N \times 0.3],$$ where $L$ is the horizontal length of the metal line between nodes and $N$ is the number of half-cycle sine waves. [Equation]

In the touch panel of the present invention, the metal line may be configured to satisfy the equation below:

$$[L \times 0.03] \leq \text{amplitude of a half-cycle sine wave} \leq [L \times 0.15],$$ where $L$ is the horizontal length of the metal line between nodes. [Equation]

In the touch panel of the present invention, the mesh-typed electrode layer comprises a first direction mesh-typed electrode layer, a second direction mesh-typed electrode layer, an insulation layer, a bridge, and so on.

The first direction mesh-typed electrode layer may comprise a plurality of first direction electrode cells connected in a first direction on the substrate layer.

The second direction mesh-typed electrode layer may comprise a plurality of second direction electrode cells spaced apart in a second direction on the substrate layer.

The insulation layer is formed on the first and second direction mesh-typed electrode layers.

The bridge is formed on the insulation layer with a portion penetrating the insulation layer to connect the second direction electrode cells.

In the touch panel of the present invention, the mesh-typed electrode layer comprises a lower mesh-typed electrode layer, an interlayer insulation layer, and an upper mesh-typed electrode layer.

The lower mesh-typed electrode layer is formed on the substrate layer.

The interlayer insulation layer is formed on the lower mesh-typed electrode layer.

The upper mesh-typed electrode layer is formed on the interlayer insulation layer.

Advantageous Effects

The touch panel of the present invention with such a configuration can minimize the moiré phenomenon by modifying the metal lines between the nodes in the mesh-typed electrode layer into a wave shape.

The touch panel of the present invention can also minimize the starburst phenomenon by optimizing the metal lines into a 2-point wave shape, and a 3-point wave shape.

DESCRIPTION OF DRAWINGS

FIG. 2 shows cross-sectional views illustrating stacked structures of mesh-typed electrode layers according to the present invention.

FIG. 3 shows top views of touch panels having mesh-typed electrode layers according to the present invention.

FIG. 4 is a shape diagram of metal lines between nodes in mesh-typed electrode layers according to the present invention.

FIG. 5 shows that metal lines between nodes in mesh-typed electrode layers according to the present invention are configured in the form of a sine wave.

FIG. 6 shows horizontal lengths of metal lines between nodes and horizontal lengths of half-cycle sine waves when the metal lines between the nodes in mesh-typed electrode layers are configured in the form of a sine wave.

FIG. 7 shows a horizontal length of a metal line between nodes and an amplitude of a half-cycle sine wave when the metal line between the nodes in a mesh-typed electrode layer is configured in the form of a sine wave.

FIG. 8 shows photographs of a starburst test on touch panels having mesh-typed electrode layers according to the present invention.

BEST MODE

Figure 1:
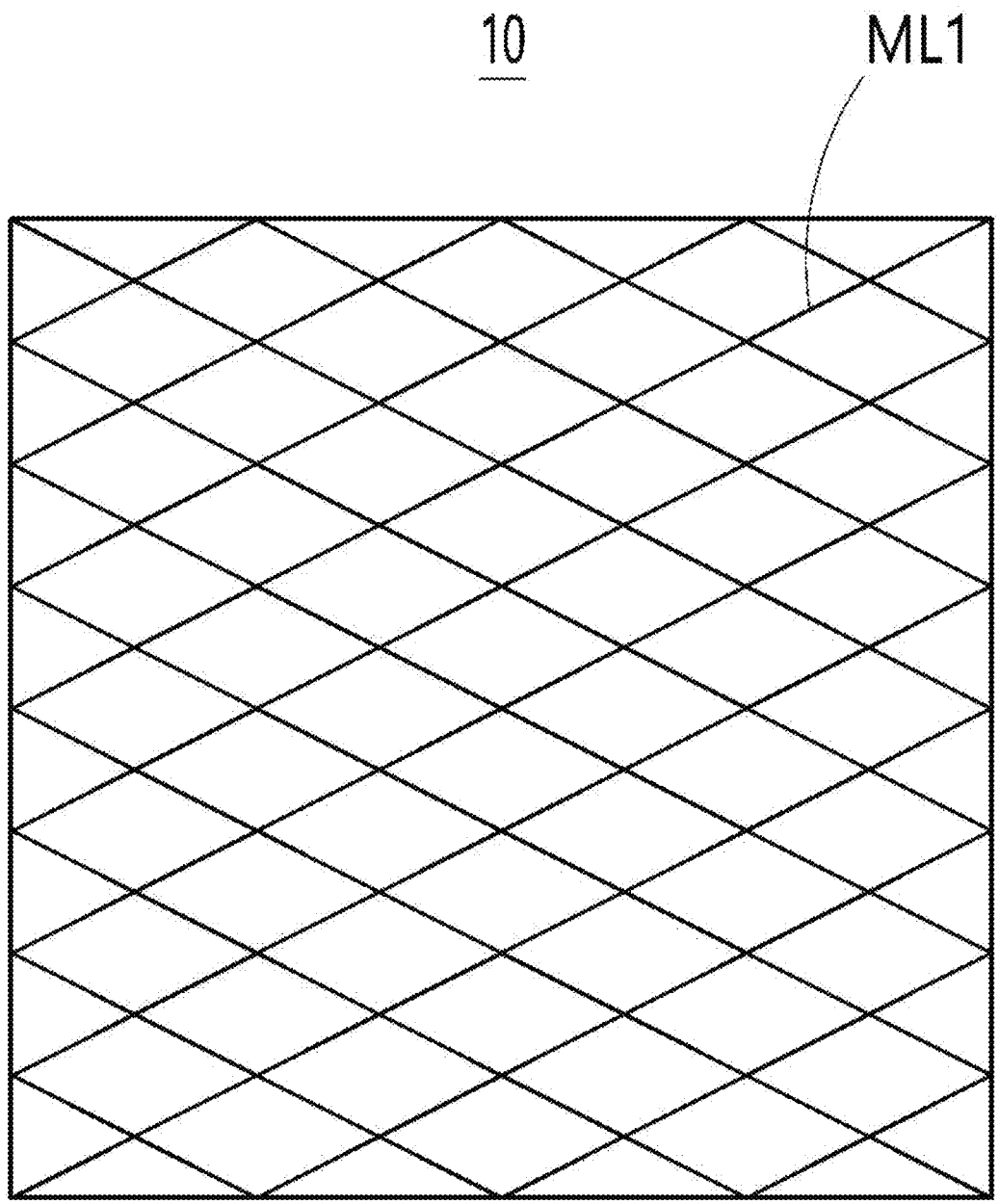
FIG. 1 is a top view of a touch panel having a mesh-typed electrode layer according to the prior art.

Hereinafter, the present invention will be described in more detail with reference to the accompanying drawings.

FIG. 2 shows cross-sectional views illustrating stacked structures of mesh-typed electrode layers according to the present invention.

As shown in (a) of FIG. 2, a mesh-typed electrode layer 120 can be formed on a substrate layer 110 in a single-layer structure.

The substrate layer 110 is a base, which may be formed of glass, a transparent plastic, a transparent polymer film, or the like.

The polymer film can be, for example, cyclo-olefin polymer (COP), polycarbonate, polyethylene terephthalate (PET), polymethylmethacrylate, polyimide, polyethylene naphthalate, polyethersulfone, and the like.

The substrate layer 110 may further comprise a separation/protective layer or may be replaced by a separation/protective layer.

The separation layer is intended for peeling off during the manufacturing process and may comprise a polyimide-based polymer, a polyvinyl alcohol-based polymer, a polyamic acid-based polymer, a polyamide-based polymer, a polyethylene-based polymer, a polystyrene-based polymer, a polynorbornene-based polymer, a phenylmaleimide copolymer, a polyazobenzene-based polymer, or the like.

The protective layer is optionally formed between the separation layer and the mesh-typed electrode layer 120 above it to protect the mesh-typed electrode layer 120 along with the separation layer. The protective layer can block the effect of the etchant forming the mesh-typed electrode layer 120 on the separation layer during the manufacturing process. The protective layer may comprise an organic insulation film or an inorganic insulation film.

The mesh-typed electrode layer 120 of a single-layer structure may include a first direction mesh-typed electrode layer 121, a second direction mesh-typed electrode layer 122, an insulation layer 123, a bridge 124, and so on.

The first direction mesh-typed electrode layer 121 may function as a driving electrode for detecting a touch. The first direction mesh-typed electrode layer 121 may include a plurality of electrode cells. The electrode cells may be arranged in a connected arrangement, for example, in the x-axis direction (front-to-back direction in (a) of FIG. 2).

The first direction mesh-typed electrode layer 121 may be made of a conductive metal. The conductive metal may be gold (Au), silver (Ag), copper (Cu), molybdenum (Mo), aluminum (Al), palladium (Pd), neodymium (Nd), silver-palladium-copper (APC) alloy, or the like. Alternatively, the first direction mesh-typed electrode layer 121 may be formed of a laminate. The laminate can be, for example, a triple layer of nickel-copper layer/copper layer/nickel copper layer, a triple layer of nickel-copper layer/copper layer/nickel layer, a double layer of nickel-copper layer/copper layer, or a triple layer of black nickel layer/copper layer/black nickel layer.

The first direction mesh-typed electrode layer 121 may be formed in a mesh pattern. The mesh pattern may have a line width of 2 to 10 μm. If the line width is less than 2 μm, there may be process difficulties, and if it exceeds 10 μm, the aperture ratio may become small and the transmittance may be poor. The optimal line width can be 2 to 7 μm. The pitch may be 150 to 450 μm. If the pitch is less than 150 μm, the transmittance is poor, and if the pitch exceeds 450 μm, the pattern visibility may deteriorate. The optimal pitch can be 300 μm.

The second direction mesh-typed electrode layer 122 can function as a receiving electrode for detecting a touch. The second direction mesh-typed electrode layer 122 may include a plurality of electrode cells. The electrode cells may be spaced apart, for example, in the y-axis direction (the left-to-right direction in (a) of FIG. 2), and may also be spaced apart horizontally from the electrode cells of the first direction mesh-typed electrode layer 121.

Since the material, laminate, line width, pitch, etc. of the second direction mesh-typed electrode layer 122 are the same as or similar to those of the first direction mesh-typed electrode layer 121, the detailed description of the second direction mesh-typed electrode layer 122 will be replaced with the relevant description of the first direction mesh-typed electrode layer 121.

The insulation layer 123 protects the first and second direction mesh-typed electrode layers 121 and 122, and can be formed on the first direction mesh-typed electrode layer 121 and the second direction mesh-typed electrode layer 122.

The insulation layer 123 may be made of any insulating material. The insulation layer 123 may be, for example, an inorganic insulator or an organic insulator. An inorganic insulator may be a silicon oxide, for example. As an organic insulator, a (meth)acrylic resin, a melamine resin, a polyimide resin, a polyurethane resin, or the like may be used. The insulation layer 123 can also be a mixture of inorganic and organic insulators.

The insulation layer 123 can also be made of a varnish-type material that is capable of being filmable. Examples of varnish-type materials include polysilicon-based materials such as polydimethylsiloxane (PDMS), polyorganosiloxane (POS), polyimide-based materials, or polyurethane-based materials such as spandex. These varnish-type materials are flexible insulators that can increase the elongation of the touch panel and increase its dynamic folding ability.

The insulation layer 123 may have contact holes for penetration of the bridge 124 connecting the electrode cells of the second direction mesh-typed electrode layer 122.

The bridge 124 connects the spaced apart electrode cells of the second direction mesh-typed electrode layer 122 in the y-axis direction. The bridge 124 can be made of a conductive metal.

Portions (contacts) of the bridge 124 may penetrate the insulation layer 123 and be connected to the electrode cell of the lower second direction mesh-typed electrode layer 122, and other portions may be connected on the upper surface of the insulation layer 123.

The bridge 124 may also be configured in the same mesh pattern as the first and second direction mesh-typed electrode layers 121 and 122.

As shown in (b) of FIG. 2, a mesh-typed electrode layer 220 may be formed on a substrate layer 210 in a double-layer structure.

The double-layer mesh-typed electrode layer 220 may include a lower mesh-typed electrode layer 221, an interlayer insulation layer 222, and an upper mesh-typed electrode layer 223.

The lower mesh-typed electrode layer 221 is formed on the substrate layer 210 and may function as a driving electrode for detecting a touch. The lower mesh-typed electrode layer 221 may include a plurality of electrode cells. The plurality of electrode cells may be arranged in a connected arrangement, for example, in the x-axis direction (front-to-back direction in (b) of FIG. 2).

The lower mesh-typed electrode layer 221 may be made of a conductive metal in a mesh pattern. The lower mesh-typed electrode layer 221 may also be formed of a laminate.

The interlayer insulation layer 222 can be formed on the lower mesh-typed electrode layer 221 to insulate and separate the lower mesh-typed electrode layer 221 from the upper mesh-typed electrode layer 223.

The interlayer insulation layer 222 can be made of any insulating material. For example, the interlayer insulation layer 222 may be an inorganic insulator, an organic insulator, a varnish-type material, or the like.

The upper mesh-typed electrode layer 223 is formed on the interlayer insulation layer 222 and may function as a receiving electrode for detecting a touch. The upper mesh-typed electrode layer 223 may include a plurality of electrode cells. The plurality of electrode cells may be arranged in a connected arrangement, for example, in the y-axis direction (left-to-right direction in (b) of FIG. 2).

The upper mesh-typed electrode layer 223 may be made of a conductive metal in a mesh pattern. The upper mesh-typed electrode layer 223 may also be formed of a laminate.

FIG. 3 shows top views of touch panels having mesh-typed electrode layers according to the present invention, and FIG. 4 is a shape diagram of metal lines between nodes in mesh-typed electrode layers according to the present invention.

As shown in (a) of FIG. 3, electrode cells in the mesh-typed electrode layer 120 of the single-layer structure are configured in a mesh pattern. The mesh pattern may have a metal line ML2 between nodes N1 and N2 in the form of a wave.

As shown in FIG. 4, the metal line ML2 may be configured in various wave shapes, such as a 1-point wave shape as shown in (a) of FIG. 4, a 2-point wave shape as shown in (b) of FIG. 4, a 3-point wave shape as shown in (c) of FIG. 4, a 4-point wave shape as shown in (d) of FIG. 4, and the like.

Table 1 below shows the evaluation of the conformance of the mesh-typed electrode layer 120 of a single-layer structure by measuring moiré, starburst, and transmittance while changing the wave shape of the metal line ML2 between the nodes. The mesh-typed electrode layer 120 was made of copper (Cu), and has a line width of 3 μm and a pitch of 270 μm. The evaluation indicators were expressed as "Bad<1<2<3<4<Good". The conforming scope was defined as a range where moiré and starburst were 4 or more, and the transmittance was not reduced by more than 0.9% P compared to the transmittance of the 1-point wave shape of the single-layer structure (90.3%−0.9%=89.4% or more in the table below).

TABLE 1

| Wave point | Moiré evaluation | Starburst evaluation | Transmittance (%) | Comprehensive evaluation |
|---|---|---|---|---|
| 1 | 4 | 3 | 90.3 | Decrease in starburst avoidance performance |
| 2 | 4 | 4 | 89.8 | |
| 2 + 1 (combination) | 4 | 4 | 89.9 | |
| 2 + 3 (combination) | 4 | 4 | 89.7 | |
| 3 | 4 | 4 | 89.6 | |
| 3 + 1 (combination) | 4 | 4 | 89.7 | |
| 4 | 4 | 4 | 88.9 | Decrease in transmittance |

Based on the evaluation results in Table 1, the 1-point wave shape did not perform well in starburst avoidance. The 4-point wave shape did not meet the lower limit (89.4%) of the single-layer structure in terms of transmittance.

Therefore, it is possible to use 2- or 3-point wave shape alone, a combination of 2- and 3-point wave shapes, or a combination of 1-point wave shape and 2- or 3-point wave shape as the metal lines between nodes in the mesh-typed electrode layer 120 of the single-layer structure.

Meanwhile, as shown in (b) of FIG. 3, the electrode cells are also organized in a mesh pattern in the mesh-typed electrode layer 220 of the double-layer structure. The mesh pattern may comprise wavy metal lines ML31 and ML32 between the nodes N1 and N2 in both the lower and upper mesh-typed electrode layers. The lower and upper metal lines ML31 and ML32 may partially overlap. The lower and upper metal lines ML31 and ML32 can be organized in the same way as in the single-layer structure, in the form of 1- to 4-point wave shapes and combinations thereof.

Table 2 below shows the evaluation of the conformance of the mesh-typed electrode layer 220 of a double-layer structure by measuring moiré, starburst, and transmittance while changing the wave shape of the metal lines ML31 and ML32. The mesh-typed electrode layer 220 was made of copper (Cu), and has a line width of 3 μm and a pitch of 200

μm. The evaluation indicators were expressed as "Bad<1<2<3<4<Good". The conforming scope was defined as a range where moiré and starburst were 4 or more, and the transmittance was not reduced by more than 0.9% P compared to the transmittance of the 1-point wave shape of the double-layer structure (89.2%–0.9%=88.3% or more in the table below).

TABLE 2

| Wave point | Moiré evaluation | Starburst evaluation | Transmittance (%) | Comprehensive evaluation |
|---|---|---|---|---|
| 1 | 4 | 3 | 89.2 | Decrease in starburst avoidance performance |
| 2 | 4 | 4 | 88.9 | |
| 2 + 1 (combination) | 4 | 4 | 88.9 | |
| 2 + 3 (combination) | 4 | 4 | 88.7 | |
| 3 | 4 | 4 | 88.6 | |
| 3 + 1 (combination) | 4 | 4 | 88.6 | |
| 4 | 4 | 4 | 87.9 | Decrease in transmittance |

Based on the evaluation results in Table 2, the 1-point wave shape did not perform well in starburst avoidance. The 4-point wave shape did not meet the lower limit (88.3%) of the double-layer structure in terms of transmittance.

Therefore, it is possible to configure the metal lines ML31 and ML32 in the mesh-typed electrode layer 220 of the double-layer structure with a 2- or 3-point wave shape alone, a combination of 2- and 3-point wave shapes, or a combination of 1-point wave shape and 2 or 3-point wave shape.

This result is the same as that of the mesh-typed electrode layer 120 of the single-layer structure. Accordingly, in the general structures of the mesh-typed electrode layer, which are the single-layer structure and the double-layer structure, 2- or 3-point wave shape can be used alone or in combination thereof to satisfy the conforming scopes of both moiré and starburst, which has technical significance, except for 1-point wave shape and 4- or more point wave shapes.

FIG. 5 shows that metal lines between nodes in mesh-typed electrode layers according to the present invention are configured in the form of a sine wave.

As shown in FIG. 5, when the metal lines between the nodes are configured in the form of a sine wave, it can be configured in the form of a top/bottom array wave shape as shown in (a) of FIG. 5, a top array as shown in (b) of FIG. 5, a bottom array as shown in (c) of FIG. 5, or mixed arrays as shown in (d) and (e) of FIG. 5.

The metal lines ML2 between the nodes in the mesh-typed electrode layer 120 of the single-layer structure were configured in the form of 2-point wave shapes of top and bottom array sine waves as shown in (b) and (c) of FIG. 5, respectively, and, in Table 3 below, moiré, starburst, and transmittance were measured and compared with 1-point wave shape and 2-point wave shape of sine waves. Here, the material, line width, and pitch of the mesh-typed electrode layer 120 were the same as in Table 1, and the evaluation indicators were the same as well.

TABLE 3

| Wave point (array type) | Moiré evaluation | Starburst evaluation | Transmittance (%) | Comprehensive evaluation |
|---|---|---|---|---|
| 1 (top or bottom array) | 4 | 3 | 90.3 | Decrease in starburst avoidance performance |
| 2 (top/bottom array) | 4 | 4 | 89.8 | |
| 2 (top array) | Good | 4 | 89.9 | |
| 2 (bottom array) | Good | 4 | 89.8 | |

The evaluation results in Table 3 show that when configuring the 2-point wave shape in the form of a sine wave, there is no significant difference in starburst when the half-cycle sine waves are arranged all on the top or all on the bottom. However, some improvement in moiré avoidance performance is observed.

The metal lines ML2 between the nodes in the mesh-typed electrode layer 120 of the single-layer structure were configured in a random combination of half-cycle sine waves as shown in (d) and (e) in FIG. 5, and, in Table 4 below, moiré, starburst, and transmittance were measured and compared to 3-point wave shape of the alternating top and bottom array. Here, the material, line width, and pitch of the mesh-typed electrode layer 120 were the same as in Table 1, and the evaluation indicators were the same as well.

TABLE 4

| Wave point (array type) | Moiré evaluation | Starburst evaluation | Transmittance (%) | Comprehensive evaluation |
|---|---|---|---|---|
| 3 (alternating top and bottom array) | 4 | 4 | 89.6 | |
| 3 (random combination array) | Good | 4 | 89.7 | |

The evaluation results in Table 4 show that the random combination array of 3-point wave shapes did not make a significant difference in starburst avoidance performance, but did improve moiré avoidance.

FIG. 6 shows horizontal lengths of metal lines between nodes and horizontal lengths of half-cycle sine waves when the metal lines between the nodes in mesh-typed electrode layers are configured in the form of a sine wave.

As shown in (a) of FIG. 6, when the metal line ML2 between the nodes is configured in the form of 2 or 3-point wave shape of a sine wave, it is preferable that the horizontal lengths L11/L12 and L21/L22/L23 of the half-cycle sine waves satisfy the following equations [1] and [2] with respect to the horizontal lengths L1 and L2 of the metal line between the nodes. In the following equations [1] and [2], N is the number of half-cycle sine waves.

$$[L1/N - L1/N \times 0.3] \leq L11, L12 \leq [[L1/N + L1/N \times 0.3]] \quad \text{Equation [1]}$$

$$[L2/N - L2/N \times 0.3] \leq L21, L22, L23 \leq [[L2/N + L2/N \times 0.3]] \quad \text{Equation [2]}$$

If the horizontal lengths L11/L12 and L21/L22/L23 of the half-cycle sine waves have a variation rate of more than 30% with respect to the horizontal lengths L1 and L2 of the metal lines between the nodes, the unevenness of the pattern density increases, which is undesirable because it reduces the pattern visibility (degree of visibility).

FIG. 7 shows a horizontal length of a metal line between nodes and an amplitude of a half-cycle sine wave when the metal line between the nodes in a mesh-typed electrode layer is configured in the form of a sine wave.

In FIG. 7, when the metal line ML2 between the nodes is configured in the form of a 2-point wave shape of a normal sine wave, it is preferable that the amplitude H1 and H2 of the half-cycle sine wave satisfy the equation [3] below with respect to the horizontal length L of the metal line between the nodes.

$$[L \times 0.03] \leq \text{amplitude } H1 \text{ and } H2 \text{ of the half-cycle sine wave} \leq [L \times 0.15] \quad \text{Equation [3]}$$

Table 5 below shows the starburst and pattern visibility measurements of the mesh-typed electrode layer 120 of the single-layer structure, when the metal line ML2 between the nodes is configured in the form of a 2-point wave shape of a normal sine wave, while varying the amplitude H1 and H2 of the half-cycle sine wave with respect to the horizontal length L of the metal line between the nodes. The evaluation method was to evaluate starburst and pattern visibility while observers were moving the evaluation sample at a distance of 10 to 30 cm and an angle of 0 to 45 degrees under external natural light (noon on clear, cloudless weather). The evaluation results of 10 observers per evaluation sample were averaged. The evaluation indicators were expressed as "Bad<1<2<3<4<5 (Good)". The mesh-typed electrode layer 120 had the same material, line width, and pitch as shown in Table 1.

TABLE 5

| | Amplitude (H1, H2)/horizontal length (L) | | | | |
|---|---|---|---|---|---|
| | 0.01 | 0.03 | 0.08 | 0.15 | 0.17 |
| Starburst evaluation | 1 | 3 | 5 | 5 | 4 |
| Pattern visibility evaluation | 5 | 5 | 4 | 3 | 2 |
| Comprehensive evaluation | 6 | 8 | 9 | 8 | 6 |

From the evaluation results in Table 5, a pattern can be determined as applicable when the comprehensive result of starburst and pattern visibility is 7 or higher. Based on these determination criteria, it is desirable to keep the amplitude H1 and H2 of the half-cycle sine wave within 3 to 15% of the horizontal length L of the metal line between the nodes, as shown in Equation [3] above.

FIG. 8 shows photographs of a starburst test on touch panels having mesh-typed electrode layers according to the present invention.

(a) of FIG. 8 shows a case where the starburst evaluation indicator is 'Bad'. As can be seen, the light smearing is quite pronounced, clearly forming an 'X' shape.

(b) of FIG. 8 shows a case where the starburst evaluation indicator is '3'. This is the same result as the 1-point wave shape evaluated above, where the light smearing is also evident enough to make the 'X' shape visible.

(c) of FIG. 8 shows a case where the starburst evaluation indicator is '4'. This is the result of the 2 and 3-point wave shape configurations evaluated above, alone or in combination. Although there is some light smearing, the 'X' shape appears faintly and is within the range that is acceptable to the user.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

DESCRIPTION OF REFERENCE NUMERALS

10,120,220: mesh-typed electrode layer
110,210: substrate layer
121/122: first/second direction mesh-typed electrode layer
221/223: lower/upper mesh-typed electrode layer
123,222: insulation layer
124: bridge
ML1,ML2,ML31,ML32: metal line
N1,N2: node

The invention claimed is:

1. A touch panel having a mesh-typed electrode layer, comprising:
a substrate layer; and
the mesh-typed electrode layer formed on the substrate layer, wherein
the mesh-typed electrode layer has a mesh pattern and a metal line between nodes is configured to randomly arrange half-cycle sine waves up and down, wherein the metal line satisfies the equation below:
[L×0.03]≤amplitude of the half-cycle sine wave≤[L× 0.15], where L is a horizontal length of the metal line between nodes.

2. The touch panel having the mesh-typed electrode layer according to claim 1, wherein the mesh-typed electrode layer comprises:
a first direction mesh-typed electrode layer forming a plurality of first direction electrode cells connected in a first direction on the substrate layer;
a second direction mesh-typed electrode layer forming a plurality of second direction electrode cells spaced apart in a second direction on the substrate layer;
an insulation layer formed on the first and second direction mesh-typed electrode layers; and
a bridge formed on the insulation layer with a portion penetrating the insulation layer to connect the second direction electrode cells.

3. The touch panel having the mesh-typed electrode layer according to claim 1, wherein the mesh-typed electrode layer comprises:
a lower mesh-typed electrode layer formed on the substrate layer;
an interlayer insulation layer formed on the lower mesh-typed electrode layer; and
an upper mesh-typed electrode layer formed on the interlayer insulation layer.

4. The touch panel having the mesh-typed electrode layer according to claim 1, wherein the metal line is configured in a 2-point wave shape or a 3-point wave shape.

5. The touch panel having the mesh-typed electrode layer according to claim 1, wherein the metal line is configured in combination of 1- to 3-point wave shapes.

6. A touch panel having a mesh-typed electrode layer, comprising:

a substrate layer; and the mesh-typed electrode layer formed on the substrate layer, wherein the mesh-typed electrode layer has a mesh pattern and a metal line between nodes is configured to randomly arrange half-cycle sine waves up and down, wherein the metal line satisfies the equation below:

[L/N−L/N×0.3]≤horizontal length of the half-cycle sine wave≤[[L/N+L/N×0.3], where L is a horizontal length of the metal line between nodes and N is the number of the half-cycle sine waves.

7. The touch panel having the mesh-typed electrode layer according to claim 6, wherein the metal line is configured in a 2-point wave shape or a 3-point wave shape.

8. The touch panel having the mesh-typed electrode layer according to claim 6, wherein the metal line is configured in combination of 1- to 3-point wave shapes.

9. The touch panel having the mesh-typed electrode layer according to claim 6, wherein the mesh-typed electrode layer comprises:

a first direction mesh-typed electrode layer forming a plurality of first direction electrode cells connected in a first direction on the substrate layer;

a second direction mesh-typed electrode layer forming a plurality of second direction electrode cells spaced apart in a second direction on the substrate layer;

an insulation layer formed on the first and second direction mesh-typed electrode layers; and a bridge formed on the insulation layer with a portion penetrating the insulation layer to connect the second direction electrode cells.

10. The touch panel having the mesh-typed electrode layer according to claim 6, wherein the mesh-typed electrode layer comprises:

a lower mesh-typed electrode layer formed on the substrate layer;

an interlayer insulation layer formed on the lower mesh-typed electrode layer; and an upper mesh-typed electrode layer formed on the interlayer insulation layer.

\* \* \* \* \*